(12) United States Patent
Ohno et al.

(10) Patent No.: US 11,560,112 B2
(45) Date of Patent: Jan. 24, 2023

(54) VEHICLE SEAT DEVICE

(71) Applicant: TOYOTA JIDOSHA KABUSHIKI KAISHA, Aichi-ken (JP)

(72) Inventors: Mitsuyoshi Ohno, Miyoshi (JP); Masashi Hotta, Gifu-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/507,762

(22) Filed: Oct. 21, 2021

(65) Prior Publication Data

US 2022/0219638 A1    Jul. 14, 2022

(30) Foreign Application Priority Data

Jan. 13, 2021   (JP) .............................. JP2021-003571

(51) Int. Cl.
 B60R 21/207      (2006.01)
 B60R 21/231      (2011.01)
 B60R 21/0136    (2006.01)

(52) U.S. Cl.
 CPC ........ B60R 21/207 (2013.01); B60R 21/0136 (2013.01); B60R 21/23138 (2013.01); *B60R 2021/23146* (2013.01)

(58) Field of Classification Search
 None
 See application file for complete search history.

(56) References Cited

U.S. PATENT DOCUMENTS

| | | | | |
|---|---|---|---|---|
| 2,839,312 | A  * | 6/1958 | Barenyi | B62D 1/18 296/64 |
| 6,991,060 | B2 * | 1/2006 | Chernoff | B60N 2/14 297/344.21 |
| 10,131,307 | B2 * | 11/2018 | Miyata | B60R 21/0136 |
| 10,336,275 | B2 * | 7/2019 | Sundararajan | B60R 21/20 |
| 11,052,786 | B2 * | 7/2021 | Ajisaka | B60N 2/06 |
| 11,110,821 | B2 * | 9/2021 | Luchner | B60K 35/00 |
| 2010/0187850 | A1 * | 7/2010 | Murray | B62D 31/003 296/64 |
| 2011/0012390 | A1 * | 1/2011 | Baumann | B60N 2/01 296/210 |
| 2018/0134180 | A1 | 5/2018 | Ajisaka | |
| 2018/0222347 | A1 | 8/2018 | Hirayama et al. | |

FOREIGN PATENT DOCUMENTS

| | | | | |
|---|---|---|---|---|
| GB | 2334240 A | * | 8/1999 | .......... B60R 22/023 |
| JP | 201879770 A | | 5/2018 | |
| JP | 2018122832 A | | 8/2018 | |

* cited by examiner

*Primary Examiner* — Faye M Fleming
(74) *Attorney, Agent, or Firm* — Hauptman Ham, LLP

(57) ABSTRACT

A vehicle seat device includes: a detection unit that detects a side collision in a vehicle; a seat that is provided in a vehicle cabin so that the seat can be located at a center portion of the vehicle cabin in a vehicle width direction and that can face at least one of a front side and a rear side in a vehicle front-rear direction; a restraint portion that is provided on a seat side portion and that is movable between a retracted position in which the restraint portion does not face a seated occupant seated in the vehicle width direction, and a facing position in which the restraint portion faces the occupant in the vehicle width direction; and a movement control unit that positions the restraint portion at the facing position when the seat is located at the center portion and the detection unit detects the side collision.

9 Claims, 15 Drawing Sheets

VEHICLE SEAT DEVICE

CROSS-REFERENCE TO RELATED APPLICATION

This application claims priority to Japanese Patent Application No. 2021-003571 filed on Jan. 13, 2021, incorporated herein by reference in its entirety.

BACKGROUND

1. Technical Field

The present disclosure relates to a vehicle seat device.

2. Description of Related Art

Japanese Unexamined Patent Application Publication No. 2018-079770 (JP 2018-079770 A) discloses a vehicle in which a driver's seat can be positioned at a center portion in the vehicle width direction.

SUMMARY

When the vehicle seat of JP 2018-079770 A is located further closer to the side portion side of the vehicle than the center portion in the vehicle width direction, the distance between an occupant seated on the seat and a side door becomes small. Therefore, when a resin trim is provided on the vehicle inner side portion of the side door, the trim can restrain the occupant when a side collision occurs in the vehicle.

On the other hand, when the seat is located at the center portion in the vehicle width direction, the distance between the occupant and the side door becomes large. Therefore, in the vehicle of JP 2018-079770 A, there is room for improvement in the restraint performance of the occupant when a side collision occurs while the seat is located at the center portion in the vehicle width direction.

In consideration of the above facts, an object of the present disclosure is to obtain a vehicle seat device capable of restraining an occupant seated on a seat when a side collision occurs in a vehicle while the seat is located at the center portion in the vehicle width direction.

A vehicle seat device according to claim 1 includes: a detection unit that detects a side collision that has occurred in a vehicle; a seat that is provided in a vehicle cabin of the vehicle so as to be able to be located at a center portion of the vehicle cabin in a vehicle width direction and that is able to face at least one of a front side and a rear side in a vehicle front-rear direction; a restraint portion that is provided on a seat side portion that is a side portion of the seat, the restraint portion being movable between a retracted position in which the restraint portion does not face an occupant seated on the seat in the vehicle width direction, and a facing position in which the restraint portion faces the occupant in the vehicle width direction; and a movement control unit that positions the restraint portion at the facing position when the seat is located at the center portion and the detection unit detects the side collision.

In the claims and the present specification, the description that the movement control unit "positions the restraint portion at the facing position" means that the movement control unit moves the restraint portion to the facing position when the restraint portion is located at a position different from the facing position. In addition, the description that the movement control unit "positions the restraint portion at the facing position" means that the movement control unit keeps the restraint portion at the facing position when the restraint portion is located at the facing position.

The vehicle seat device according to claim 1 includes a detection unit that detects a side collision that has occurred in a vehicle. The vehicle seat device further includes a restraint portion that is movable between a retracted position in which the restraint portion does not face an occupant seated on the seat in the vehicle width direction, and a facing position in which the restraint portion faces the occupant in the vehicle width direction. Further, a movement control unit positions the restraint portion at the facing position when the seat is located at the center portion and the detection unit detects the side collision in the vehicle. Therefore, when the restraint portion is provided on the seat side portion on the collided side, the restraint portion provided on the seat side portion on the collided side can restrain the occupant when a side collision occurs. In addition, when the restraint portion is provided on the seat side portion on the collided side and on the uncollided side, when a side collision occurs, the restraint portion on the uncollided side can restrain the occupant who has received the reaction force from the restraint portion on the collided side and has moved toward the uncollided side.

In the vehicle seat device according to the disclosure according to claim 2, in the disclosure according to claim 1: when the side collision occurs in the vehicle, the detection unit determines whether an acceleration generated in the vehicle is equal to or higher than a predetermined first threshold value; and a side portion of a seat back of the seat is provided with a side airbag that is expanded and deployed when the detection unit determines that the acceleration is equal to or higher than the first threshold value, the side airbag being located between the restraint portion located at the facing position and the occupant.

In the disclosure according to claim 2, when the side collision occurs in the vehicle, the detection unit determines whether an acceleration generated in the vehicle is equal to or higher than a predetermined first threshold value. When the detection unit determines that the acceleration is equal to or higher than the first threshold value, the side airbag provided on the seat back is expanded and deployed, and is located between the restraint portion located at the facing position and the occupant. For example, when the side airbag provided on the side portion of the seat back on the collided side is expanded and deployed, the side airbag on the collided side restrains the occupant while receiving a reaction force from the restraint portion on the collided side. Further, for example, when the side airbag is provided on the side portions on the collided side and on the uncollided side of the seat back, the expanded and deployed side airbag on the uncollided side restrains, while receiving a reaction force from the restraint portion on the uncollided side, the occupant who has received a reaction force from the side airbag on the collided side and has moved toward the uncollided side.

In the vehicle seat device according to the disclosure according to claim 3, in the disclosure according to claim 2, when the detection unit determines that the acceleration is equal to or higher than the first threshold value, the movement control unit positions the restraint portion provided on the seat side portion on a collided side and on an uncollided side at the facing position, and the side airbag provided on the side portion of the seat back on the uncollided side is expanded and deployed.

In the disclosure according to claim 3, when the detection unit determines that the acceleration generated in the vehicle is equal to or higher than the first threshold value, the movement control unit positions the restraint portion provided on the seat side portions on the collided side and on the uncollided side at the facing position. Therefore, the restraint portion provided on the seat side portion on the collided side can restrain the occupant when a side collision occurs. Further, the side airbag on the uncollided side, which is expanded and deployed and has received a reaction force from the restraint portion provided on the seat side portion on the uncollided side, restrains the occupant who has received the reaction force from the restraint portion on the collided side and has moved toward the uncollided side.

In the vehicle seat device according to the disclosure according to claim 4, in the disclosure according to claim 2 or 3: the detection unit determines whether the acceleration generated in the vehicle is equal to or higher than a second threshold value smaller than the first threshold value; and when the detection unit determines that the acceleration is equal to or higher than the second threshold value, the movement control unit positions the restraint portion at the facing position.

In the disclosure according to claim 4, when the detection unit determines that the acceleration generated in the vehicle is lower than the first threshold value and equal to or higher than the second threshold value, the side airbag is not expanded and deployed, and the movement control unit positions the restraint portion at the facing position. Therefore, when the acceleration generated in the vehicle is not large, the occupant can be restrained only by the restraint portion without unnecessarily expanding and deploying the side airbag.

In the vehicle seat device according to the disclosure according to claim 5, in the disclosure according to any one of claims 1 to 4, the restraint portion located at the facing position faces a hip point of the occupant in the vehicle width direction.

In the disclosure according to claim 5, when a side collision occurs in the vehicle, the side airbag that has received a reaction force from the restraint portion located at the facing position can effectively restrain the lumbar portion (hip point) of the occupant.

In the vehicle seat device according to the disclosure according to claim 6, in the disclosure according to any one of claims 1 to 5: the vehicle seat device includes a moving mechanism for supporting the seat such that the seat is movable in the vehicle width direction; a vehicle body of the vehicle is provided with a vehicle body airbag that is expanded and deployed in the vehicle cabin so as to face a specific side portion that is at least one of a left side portion and a right side portion of the vehicle; when the side collision occurs in the specific side portion, the detection unit determines whether the acceleration generated in the vehicle is equal to or higher than the predetermined first threshold value; and when the seat moves from the center portion toward the specific side portion by a predetermined distance or more, the movement control unit prohibits the restraint portion provided on the seat side portion on the specific side portion side from being located at the facing position.

In the disclosure according to claim 6, when the seat that has been moved by the moving mechanism moves from the center portion of the vehicle toward the specific side portion of the vehicle by a predetermined distance or more, the movement control unit prohibits the restraint portion provided on the seat side portion on the specific side portion side from being located at the facing position. Therefore, the expansion and deployment of the vehicle body airbag that is expanded and deployed in the vehicle cabin so as to face the specific side portion of the vehicle when a side collision occurs are not hindered by the restraint portion provided on the seat side portion on the specific side portion side.

In the vehicle seat device according to the disclosure according to claim 7, in the disclosure according to any one of claims 1 to 6: the vehicle seat device includes a moving mechanism for supporting the seat such that the seat is movable in the vehicle width direction; when the seat is located further on a side portion side of the vehicle from the center portion and the restraint portion is located at the facing position, the moving mechanism is allowed to move the seat to the center portion; and when the seat is located further on the side portion side of the vehicle from the center portion and the restraint portion is not located at the facing position, the moving mechanism is prohibited from moving the seat to the center portion.

In the disclosure according to claim 7, when the seat is located at the center portion, the restraint portion is highly likely to be located at the facing position. Therefore, even when a failure occurs in the movement control unit, there is a high possibility that the occupant can be restrained by the restraint portion.

In the vehicle seat device according to the disclosure according to claim 8, in the disclosure according to any one of claims 1 to 7, the restraint portion is at least one of an armrest and a console.

In the disclosure according to claim 8, at least one of an armrest and a console, which are members generally provided in a vehicle, is used as the restraint portion. Therefore, the structure of the vehicle seat device is simpler than that in the case where a member different from the armrest and the console is provided in the vehicle seat device as the restraint portion.

In the vehicle seat device according to the disclosure according to claim 9, in the disclosure according to any one of claims 1 to 8, the restraint portion is movable between the retracted position and the facing position by manual operation.

In the disclosure according to claim 9, the restraint portion can be moved between the retracted position and the facing position by manual operation. Therefore, for example, when a failure occurs in the movement control unit, the restraint portion can be moved to the retracted position.

As described above, the vehicle seat device according to the present disclosure has an excellent effect of being capable of restraining the occupant seated on the seat when a side collision occurs in the vehicle while the seat is located at the center portion in the vehicle width direction.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
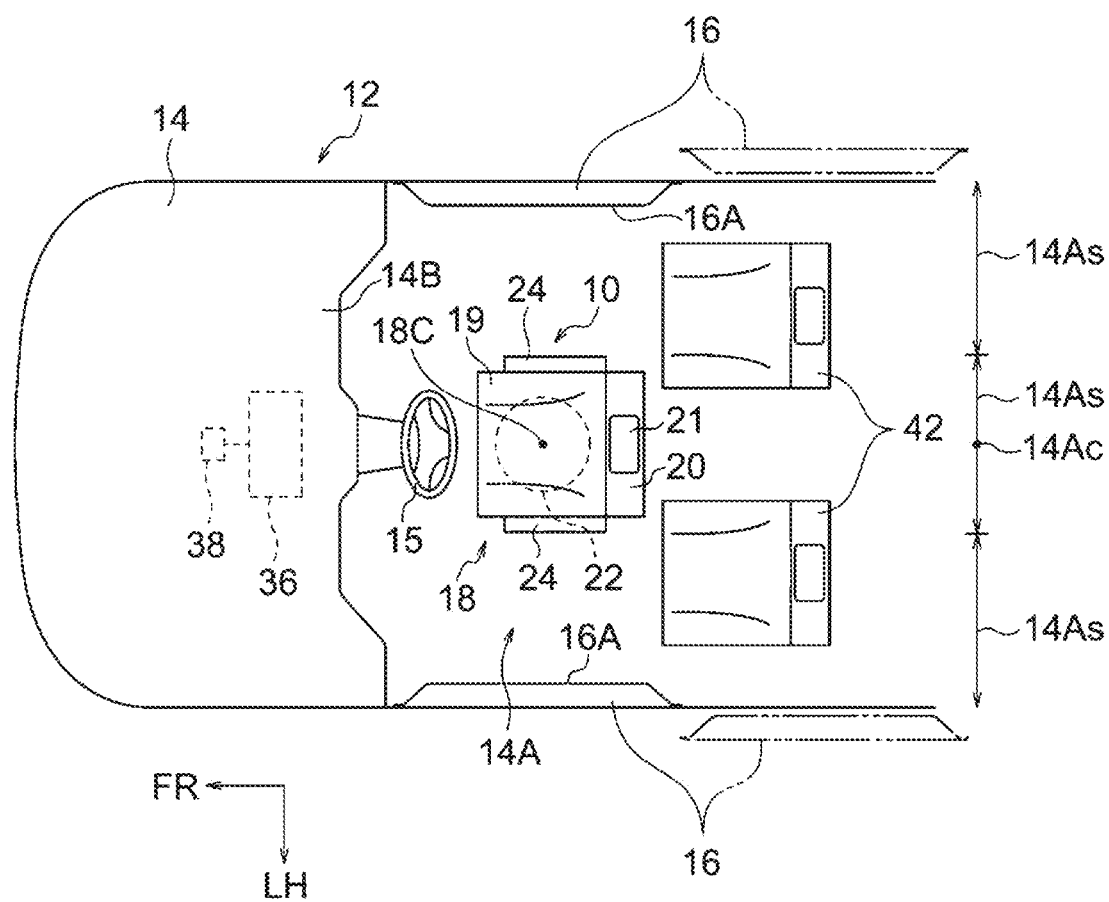
FIG. 1 is a schematic plan view showing a vehicle provided with a vehicle seat device according to a first embodiment, omitting a ceiling portion.

Hereinafter, a first embodiment of a vehicle seat device 10 according to the present disclosure will be described with reference to FIGS. 1 to 8. An arrow UP shown in the figures indicates the upper side in the vehicle up-down direction, an arrow FR indicates the front side in the vehicle front-rear direction, and an arrow LH indicates the left side in the vehicle right-left direction (vehicle width direction). The up-down direction, the front-rear direction, and the right-left direction in the following description mean the vehicle up-down direction, the vehicle front-rear direction, and the vehicle right-left direction, respectively.

The vehicle seat device 10 includes a front seat 18 (seat), a turntable 22, armrests 24 (restraint portion), rotation support shafts 26, motors 28, side airbags 30, inflators 32, an electronic control unit (ECU) 36 (detection unit) (movement control unit), and a side collision sensor 38 (detection unit). A vehicle 12 equipped with the vehicle seat device 10 can execute autonomous driving. Openings (not shown) are provided on the right and left side surfaces of the front portion of a vehicle body 14 of the vehicle 12. The right and left openings are provided with sliding front side doors 16 that open and close the openings. The vehicle inner side surfaces of the right and left front side doors 16 are composed of resin door trims 16A. The front side doors 16 are parts of the vehicle body 14.

A steering wheel 15 is rotatably supported at the center portion of a dashboard 14B shown in FIG. 1 in the vehicle width direction.

Figure 3:
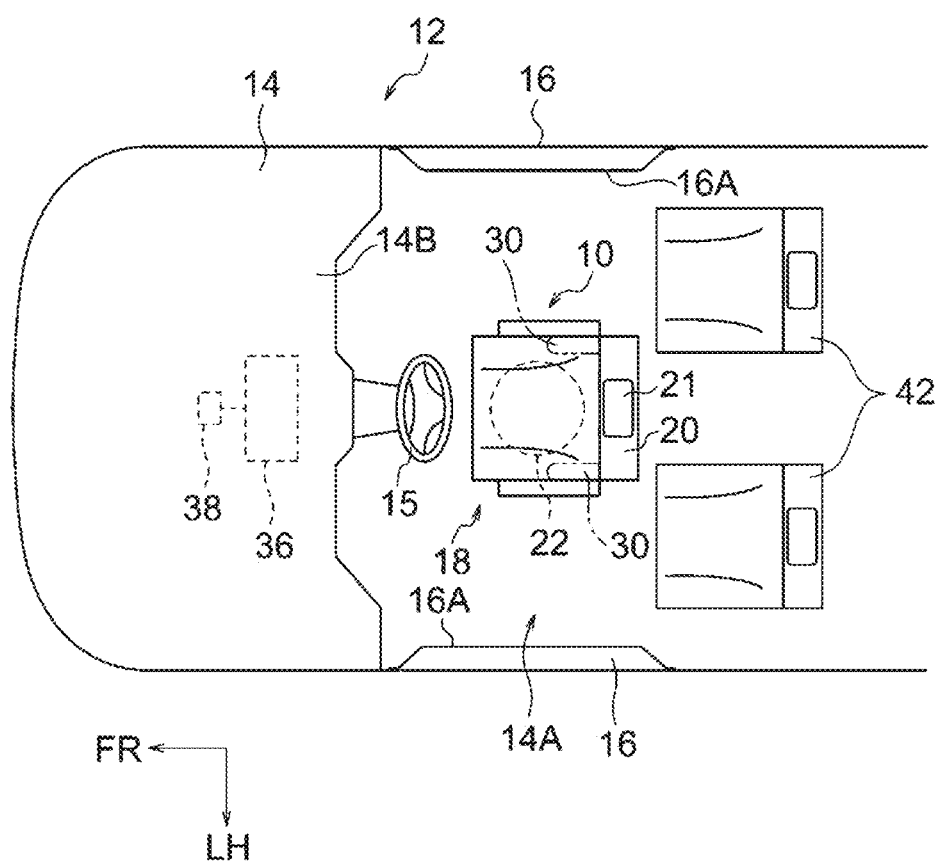
FIG. 3 is a plan view similar to that of FIG. 1 when a side collision occurs in the vehicle shown in FIG. 1.

As shown in FIGS. 1 and 3, one front seat 18 is provided in a vehicle cabin 14A of the vehicle body 14. The front seat 18 is located at the center portion in the vehicle width direction. The front seat 18 has a seat cushion 19, a seat back 20, and a headrest 21. The turntable 22 provided on the floor surface of the vehicle cabin 14A supports the seat cushion 19. The turntable 22 supports the seat cushion 19 so that the seat cushion 19 is rotatable around a rotation axis extending in the up-down direction. Therefore, with the action of the turntable 22, the seat cushion 19 can be shifted to the normal state shown in FIG. 1 and the inverted state (not shown) rotated by 180° from the normal state. The turntable 22 further has a rotation lock mechanism (not shown). For example, when an occupant seated in the front seat 18 unlocks the rotation lock mechanism, the turntable 22 becomes rotatable. In contrast, when the rotation lock mechanism is locked, the turntable 22 is restricted from rotating.

As shown in FIG. 1, each region obtained by dividing the vehicle cabin 14A into three equal parts in the vehicle width direction is defined as a divided region 14As. In the present specification and claims, the description that the front seat 18 (seat) is "located at the center portion in the vehicle width direction" means that a center point 18C of the front seat 18 in the vehicle width direction is located in the central divided region 14As. In the example shown in FIG. 1, the positions in the right-left direction of a center point 14Ac of the vehicle cabin 14A in the vehicle width direction and the center point 18C coincide with each other.

Each of the resin armrests 24 is provided on a pair of seat side portions 19A, which are the right and left side portions of the seat cushion 19. Each armrest 24 is supported by the seat side portion 19A so as to be rotatable around the horizontally extending rotation support shaft 26. When the front seat 18 is in the normal state or the inverted state, the rotation support shafts 26 are parallel to the front-rear direction. The armrests 24 are rotatable around the rotation support shafts 26 between the retracted position (see FIGS. 1 and 2) and the facing position (see FIGS. 3 to 5). The right and left armrests 24 can rotate independently of each other.

A pair of right and left electric motors 28 are provided inside the seat cushion 19. Each of the right and left motors 28 are connected to the respective right and left armrests 24 via a reduction mechanism (not shown). A restraint portion movement switch (not shown) is provided on a part of the front seat 18.

Figure 6:
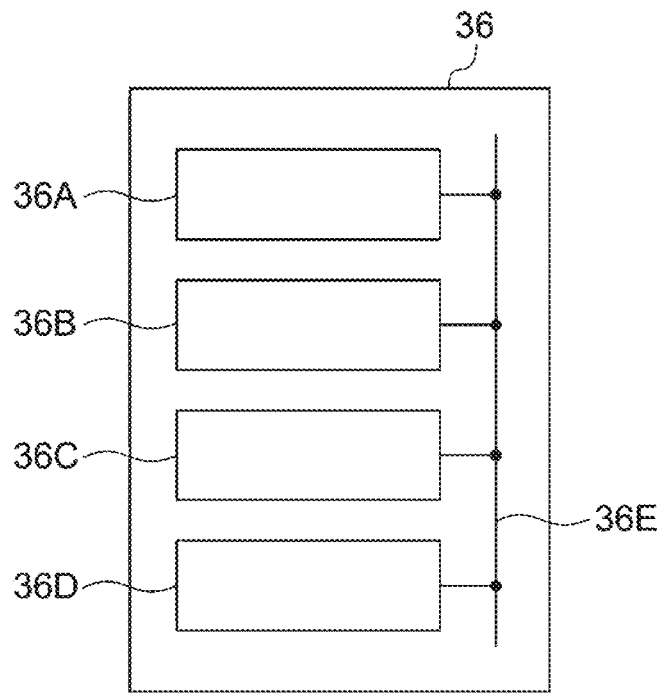
FIG. 6 is a schematic block diagram of an electronic control unit (ECU) of the vehicle shown in FIG. 1.
Figure 7:
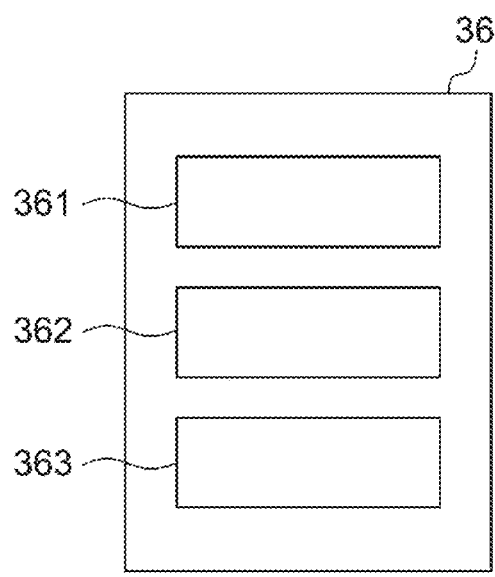
FIG. 7 is a functional block diagram of the ECU shown in FIG. 6.

The vehicle 12 is provided with the ECU 36. As shown in FIG. 6, the ECU 36 includes a central processing unit (CPU) 36A, a memory 36B such as a read only memory (ROM) and a random access memory (RAM), a non-volatile recording unit 36C such as a hard disk drive (HDD) and a solid state drive (SSD), and a communication control unit 36D. The CPU 36A, the memory 36B, the recording unit 36C, and the communication control unit 36D are connected to each other via an internal bus 36E so as to be able to communicate with each other. A control program is recorded in the recording unit 36C. In the ECU 36, the control program is read from the recording unit 36C and deployed in the memory 36B, and the control program deployed in the memory 36B is executed by the CPU 36A. As shown in FIG. 7, this functions as a detection unit 361, a movement control unit 362, and an inflator control unit 363, and executes various processes described later.

When the occupant operates the restraint portion movement switch, the movement control unit 362 of the ECU 36 supplies the electric power of the battery (not shown) to the motors 28. At this time, when the movement control unit 362 transmits a forward rotation signal to the motors 28, the armrests 24 rotate toward the facing position. In contrast, when the movement control unit 362 transmits a reverse rotation signal to the motors 28, the armrests 24 rotate toward the retracted position. The occupant can move the right and left armrests 24 independently by operating the restraint portion movement switch.

Figure 2:
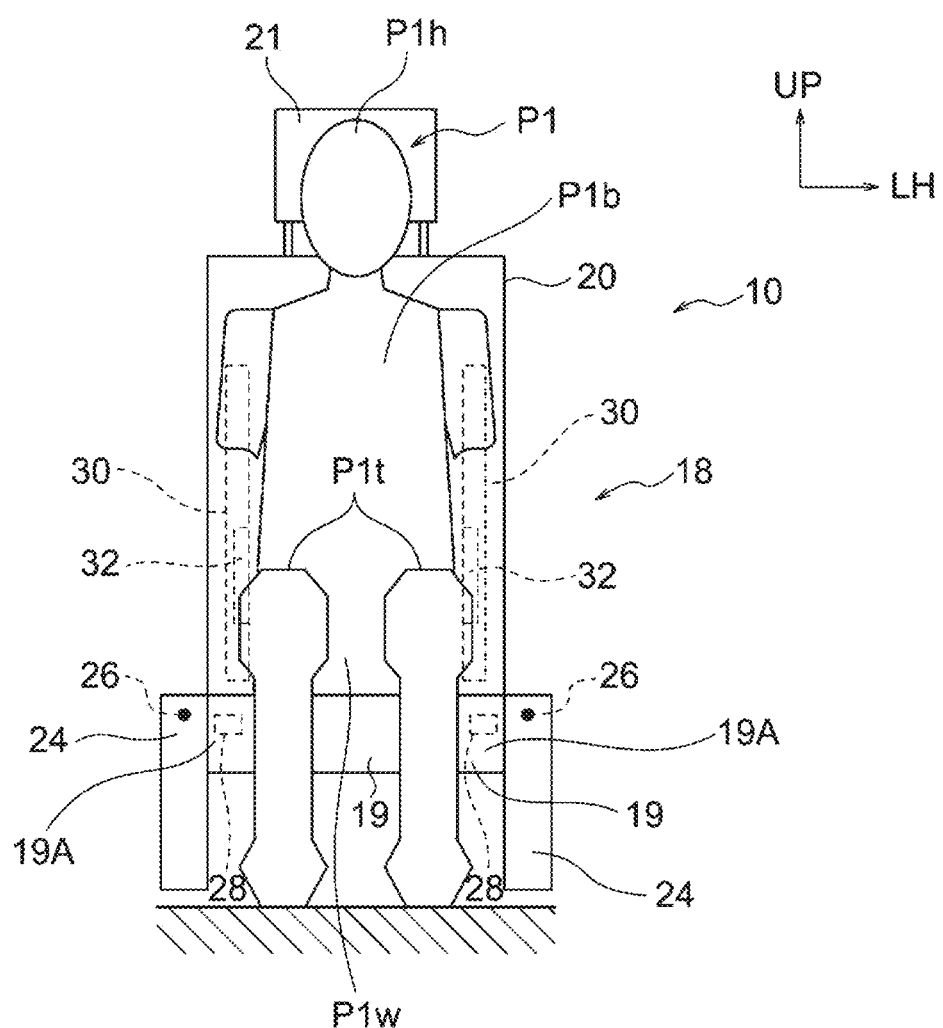
FIG. 2 is a schematic front view of a driver's seat and an occupant of the vehicle shown in FIG. 1.

As shown in FIG. 2, the side airbag 30 is housed in the left side portion and the right side portion of the seat back 20 in a folded state. Further, the inflator 32 is provided inside each side airbag 30. The inflators 32 are electrically connected to the ECU 36. A part of each side airbag 30 and each inflator 32 are fixed to a metal seat back frame (not shown) provided inside the seat back 20. Further, tear seams (not shown) are provided on the front surfaces of the right and left side portions of the seat back 20 of the front seat 18 that is in the normal state.

The vehicle 12 is further provided with the side collision sensor 38 electrically connected to the ECU 36. The side collision sensor 38 is composed of a plurality of acceleration sensors and a camera. The side collision sensor 38 outputs a side collision signal to the detection unit 361 of the ECU 36 when a side collision of the vehicle 12 is detected or predicted.

Figure 4:
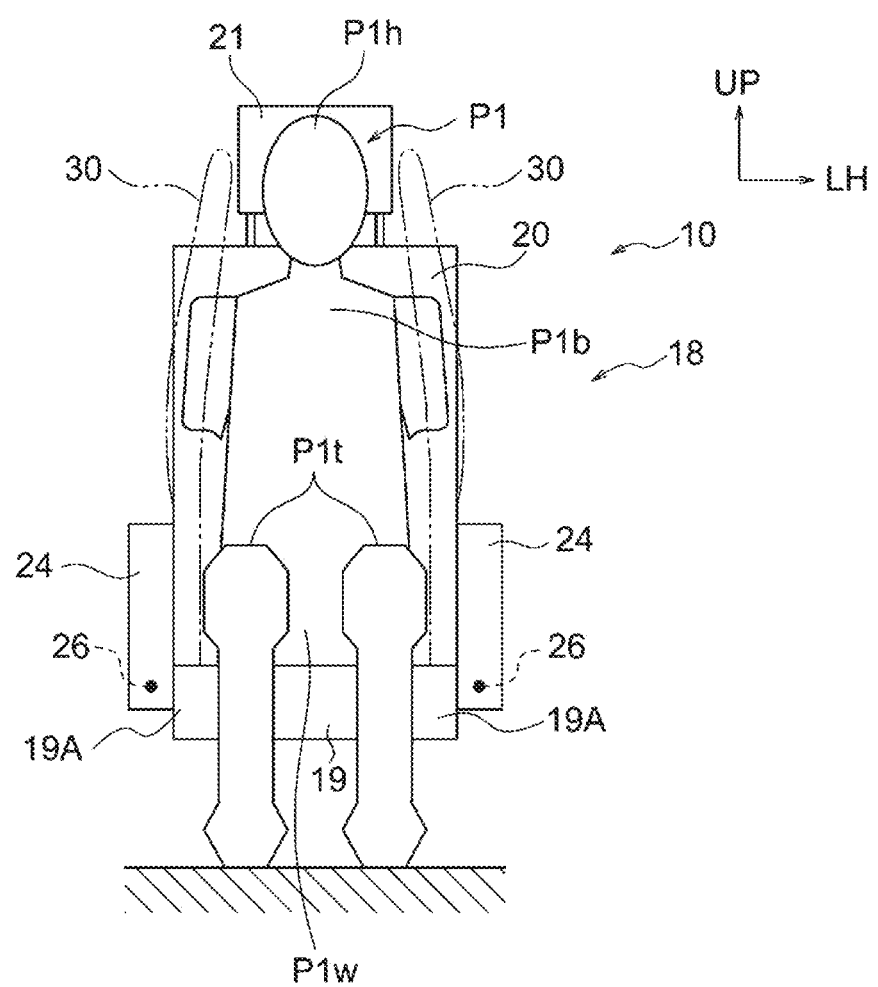
FIG. 4 is a front view similar to that of FIG. 2 when the side collision occurs in the vehicle shown in FIG. 1.
Figure 5:
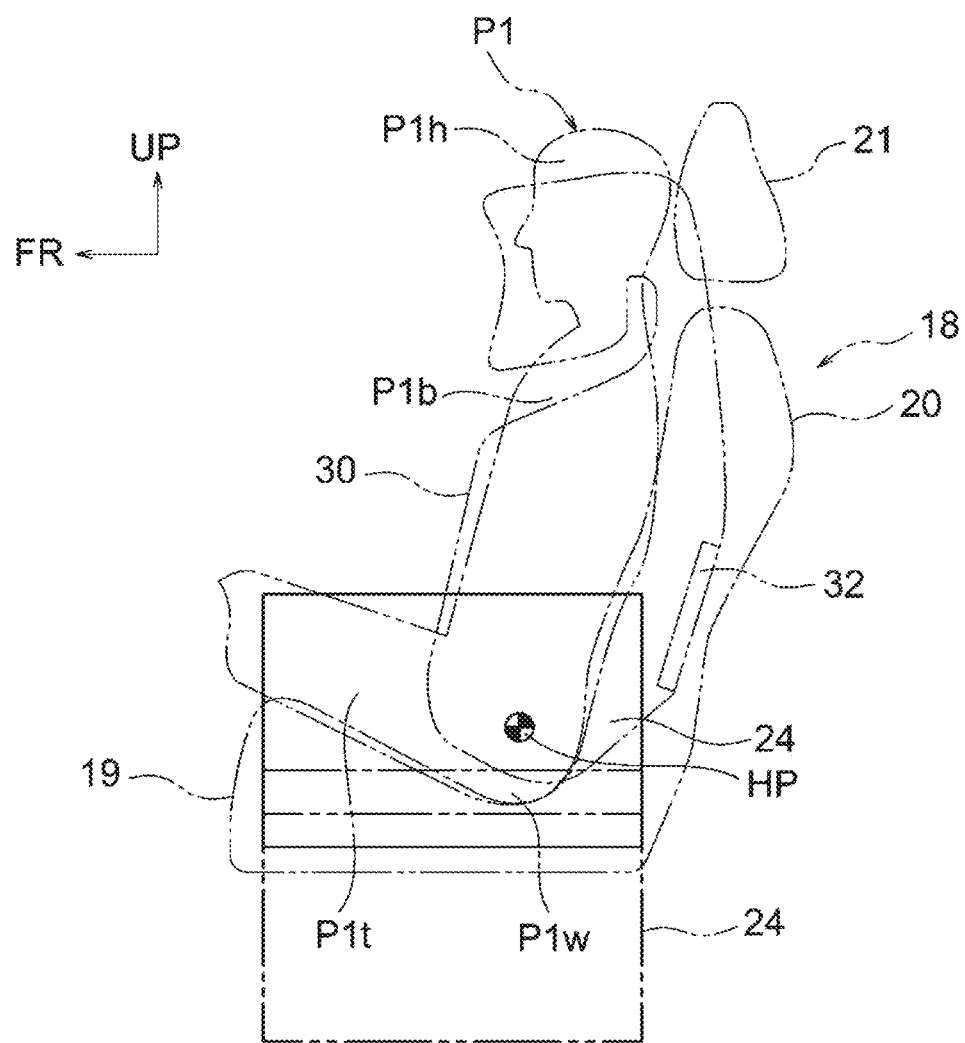
FIG. 5 is a schematic side view of the driver's seat and the occupant when the side collision occurs in the vehicle shown in FIG. 1.

In FIGS. 2, 4 and 5, a dummy P1 for a collision test is seated in the front seat 18. The dummy P1 is AM50 (50th percentile of American adult male) of World Side Impact Dummy (World SID). Each dummy P1 is seated in the front seat 18 by the seating method specified in the side collision test method. Further, the front-rear position of the seat cushion 19 with respect to the vehicle 12 and the inclination angle of the seat back 20 with respect to the seat cushion 19 are adjusted to reference setting positions corresponding to the above-mentioned seating method. The dummy P1 is equipped with a webbing of a three-point seatbelt device (not shown). Hereinafter, the dummy P1 may be referred to as an occupant P1. The seat cushion 19 supports a lumbar portion P1w and a thigh portion P1t of the occupant P1. The seat back 20 can support the back surface of a chest portion P1b of the occupant P1. The headrest 21 can support a head portion P1h of the occupant P1.

The vehicle cabin 14A is provided with a pair of right and left rear seats 42 located on the rear side of the front seat 18.

Operations and Effects

Figure 8:
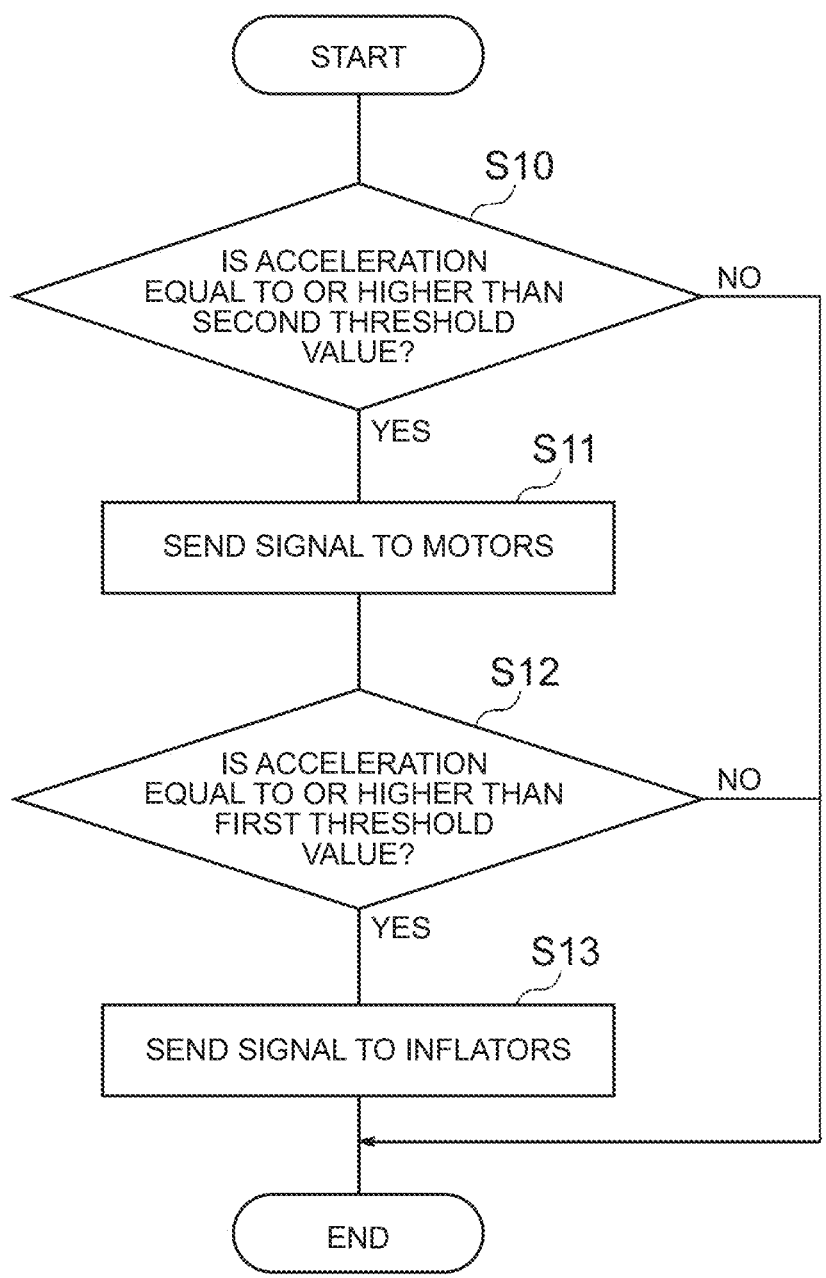
FIG. 8 is a flowchart showing a process performed by the ECU.

Next, operations and effects of the first embodiment will be described with reference to the flowchart of FIG. 8. The ECU 36 repeatedly executes the process of the flowchart of FIG. 8 every time a predetermined time elapses.

For example, assume that the right and left armrests 24 are located at the retracted position. At this time, as shown by virtual lines in FIG. 5, the right and left armrests 24 do not face the occupant P1 in the vehicle width direction. For example, when a side collision occurs on the right side portion of the vehicle 12 traveling in this state, the side collision sensor 38 outputs a side collision signal. When it is determined that a side collision has occurred in the vehicle 12 based on the information transmitted from the side collision sensor 38, the detection unit 361 of the ECU 36 compares the magnitude of the acceleration with a second threshold value, as shown in step S10. The second threshold value and a first threshold value are recorded in the ROM. The second threshold value is smaller than the first threshold value.

When the detection unit 361 of the ECU 36 determines that the detected acceleration is equal to or higher than the second threshold value (step S10: Yes), the ECU 36 proceeds to step S11. Then, the movement control unit 362 transmits a forward rotation signal to the right and left motors 28. That is, the movement control unit 362 supplies the electric power of the battery to the motors 28. As a result, as shown in FIGS. 3 to 5, the right and left armrests 24 are rotated to the facing position by the right and left motors 28. As shown in FIG. 5, the armrests 24 that have moved to the facing position face a hip point HP of the occupant P1 in the vehicle width direction. When the armrests 24 are located at the facing position before the side collision occurs, the movement control unit 362 does not transmit a signal to the right and left motors 28, and keeps the armrests 24 at the facing position.

The ECU 36 that has completed the process of step S11 proceeds to step S12. When the detection unit 361 determines that the detected acceleration is equal to or higher than the first threshold value (step S12: Yes), the ECU 36 proceeds to step S13. Then, the inflator control unit 363 transmits an operation signal to the right and left inflators 32. Thereby, the right and left inflators 32 inject gas, and the injected gas flows into the right and left side airbags 30. Thus, the right and left side airbags 30 are expanded and deployed toward the front side and the upper side of the seat back 20 while burst-opening the tear seams of the seat back 20. When the process of step S13 is completed, or when No is determined in steps S10 and S12, the ECU 36 temporarily ends the process shown in the flowchart.

As shown in FIG. 4, each side airbag 30 is located between each armrest 24 located at the facing position and the occupant P1. Therefore, the occupant P1 who has moved toward the right side relative to the vehicle 12 by the inertial force due to the collision is restrained by the side airbag 30 on the right side that receives the reaction force from the armrest 24 on the right side. Further, the occupant P1 who has moved toward the left side relative to the vehicle 12 by the reaction force received from the side airbag 30 on the right side is restrained by the side airbag 30 on the left side that receives the reaction force from the armrest 24 on the left side. Further, each side airbag 30 restrains the lumbar portion P1w so that each side airbag 30 overlaps with the hip point HP. Therefore, when the front seat 18 is located at the center portion of the vehicle cabin 14A, the side airbags 30 exhibit high restraint performance.

If the detected acceleration is less than the first threshold value and equal to or higher than the second threshold value, the armrests 24 are located at the facing position and the side airbags 30 are not expanded nor deployed. Therefore, in this case, the lumbar portion P1w and the thigh portion P1t of the occupant P1 who has moved toward the right side relative to the vehicle 12 by the inertial force due to the collision are restrained by the armrest 24 on the right side. Further, the lumbar portion P1w and the thigh portion P1t of the occupant P1 who has moved toward the left side relative to the vehicle 12 by the reaction force received from the armrest 24 on the right side are restrained by the armrest 24 on the left side. Therefore, in this case, the armrests 24 can exhibit high restraint performance. When the acceleration generated in the vehicle 12 is not large as described above, the occupant P1 can be restrained only by the armrests 24 without unnecessarily expanding and deploying the side airbags 30.

In a comparative example (not shown) in which such armrests 24 are not provided in the vehicle seat device 10, the right and left side airbags 30 are expanded and deployed when the acceleration is equal to or higher than the first threshold value. However, when the occupant P1 who has moved toward the right side relative to the vehicle 12 by the inertial force due to the collision comes into contact with the side airbag 30 on the right side, the side airbag 30 on the right side may be largely moved toward the right side. Therefore, the restraint performance of the occupant P1 by the side airbags 30 of this comparative example is lower than that of the side airbags 30 of the first embodiment.

Further, the vehicle seat device 10 uses the armrests 24, which are members generally provided in a vehicle, as the restraint portion. Therefore, the structure of the vehicle seat device 10 is simpler than that in the case where a member different from the armrests 24 is provided on the seat 18 as the restraint portion.

Second Embodiment

Figure 9:
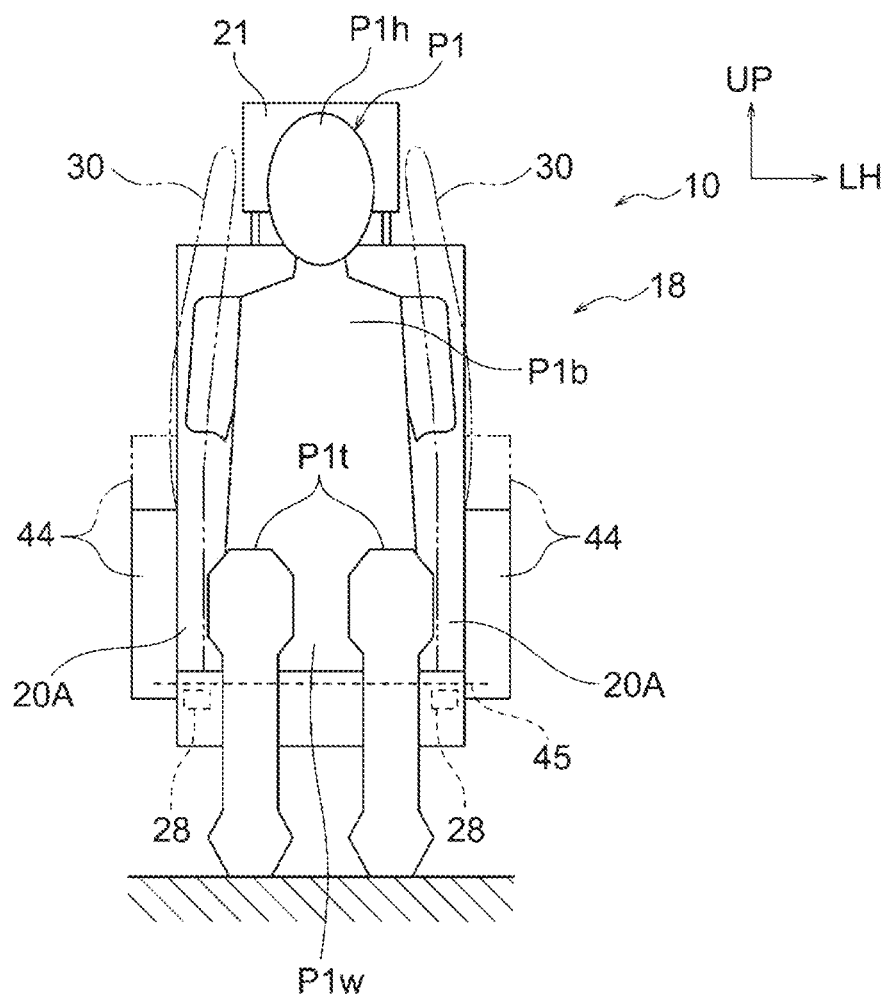
FIG. 9 is a front view similar to that of FIG. 4 of a driver's seat and an occupant of a vehicle seat device according to a second embodiment.
Figure 10:
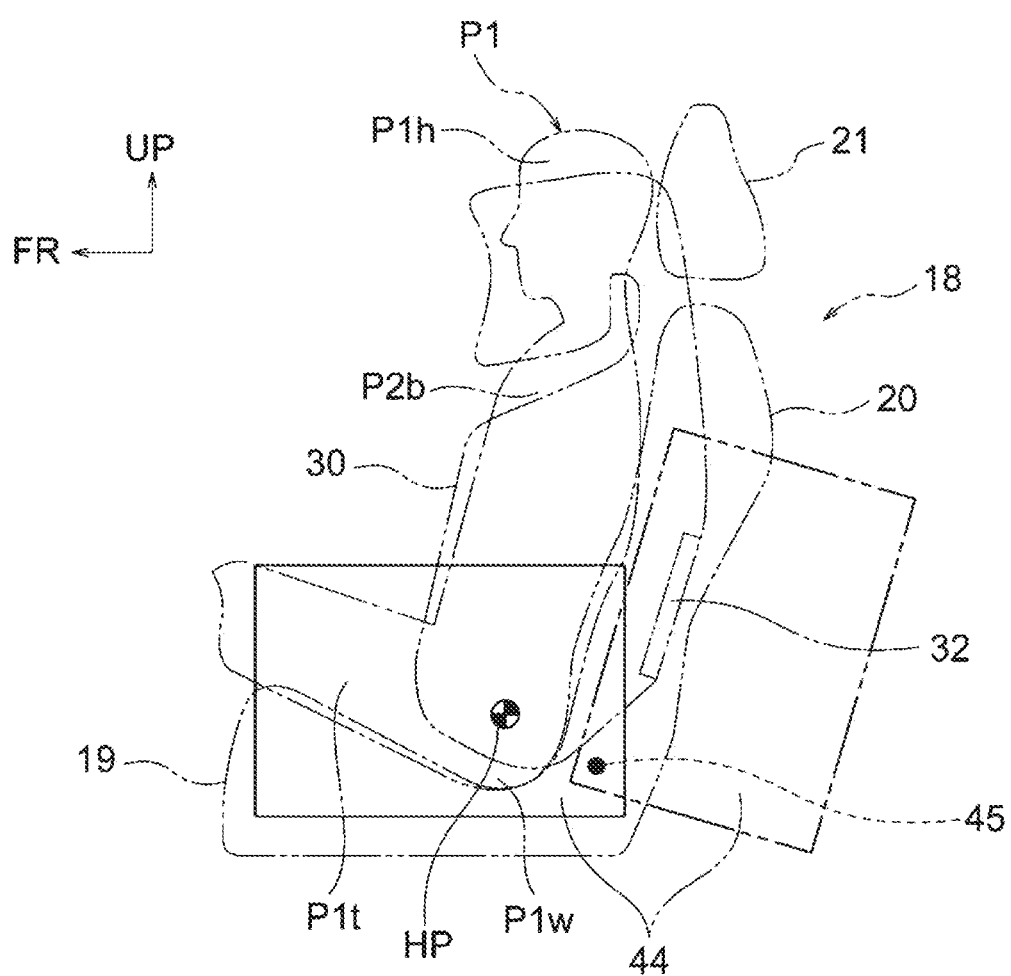
FIG. 10 is a schematic side view of the driver's seat and the occupant shown in FIG. 9 when a side collision occurs in the vehicle.

Next, a second embodiment of the vehicle seat device 10 according to the present disclosure will be described with reference to FIGS. 9 and 10. The same components as those in the first embodiment are designated by the same reference symbols, and the description thereof will be omitted as appropriate.

The vehicle seat device 10 of the second embodiment has a pair of right and left armrests 44 (restraint portion) instead of the armrests 24. Each of the resin armrests 44 is provided on a pair of seat side portions 20A, which are the right and left side portions of the seat back 20. The right and left armrests 44 are supported by the seat side portions 20A so as to be rotatable around a horizontally extending rotation support shaft 45. When the front seat 18 is in the normal state or the inverted state, the rotation support shaft 45 is parallel to the right-left direction. The right and left armrests 44 are rotatable around the rotation support shaft 45 between the retracted position (see virtual lines in FIGS. 9 and 10) and the facing position (see solid lines in FIGS. 9 and 10). The right and left armrests 44 can rotate independently of each other. Further, each of the pair of the right and left motors 28 are connected to the respective right and left armrests 44 via a reduction mechanism. By operating the restraint portion movement switch, the occupant P1 can move the right and left armrests 44 independently to the facing position and the retracted position by using the driving force of the motors 28.

Operations and Effects

Next, operations and effects of the second embodiment will be described.

Assume that the right and left armrests 44 are located at the retracted position. At this time, as shown by the virtual lines in FIGS. 9 and 10, the armrests 44 do not face the occupant P1 in the vehicle width direction. When a side collision occurs on the right side portion of the vehicle 12 traveling in this state, the detection unit 361 of the ECU 36 compares the magnitude of the acceleration detected by the side collision sensor 38 with the first threshold value and the second threshold value.

When the detection unit 361 determines that the detected acceleration is equal to or higher than the second threshold value, the movement control unit 362 transmits a forward rotation signal to the right and left motors 28. As a result, as shown by the solid lines in FIGS. 9 and 10, the right and left armrests 44 are rotated to the facing position so as to face the hip point HP in the vehicle width direction. When the armrests 44 are located at the facing position before the side collision occurs, the movement control unit 362 does not transmit a signal to the right and left motors 28, and keeps the armrests 44 at the facing position.

Further, when the detection unit 361 determines that the detected acceleration is equal to or higher than the first threshold value, the right and left side airbags 30 are expanded and deployed, and are located between the armrests 44 located at the facing position and the occupant P1.

As described above, in the vehicle seat device 10 of the second embodiment, when the detected acceleration is equal to or higher than the second threshold value, the ECU 36 positions the right and left armrests 44 at the facing position. Therefore, the vehicle seat device 10 of the second embodiment can exhibit the same operations and effects as the vehicle seat device 10 of the first embodiment.

Third Embodiment

Figure 11:
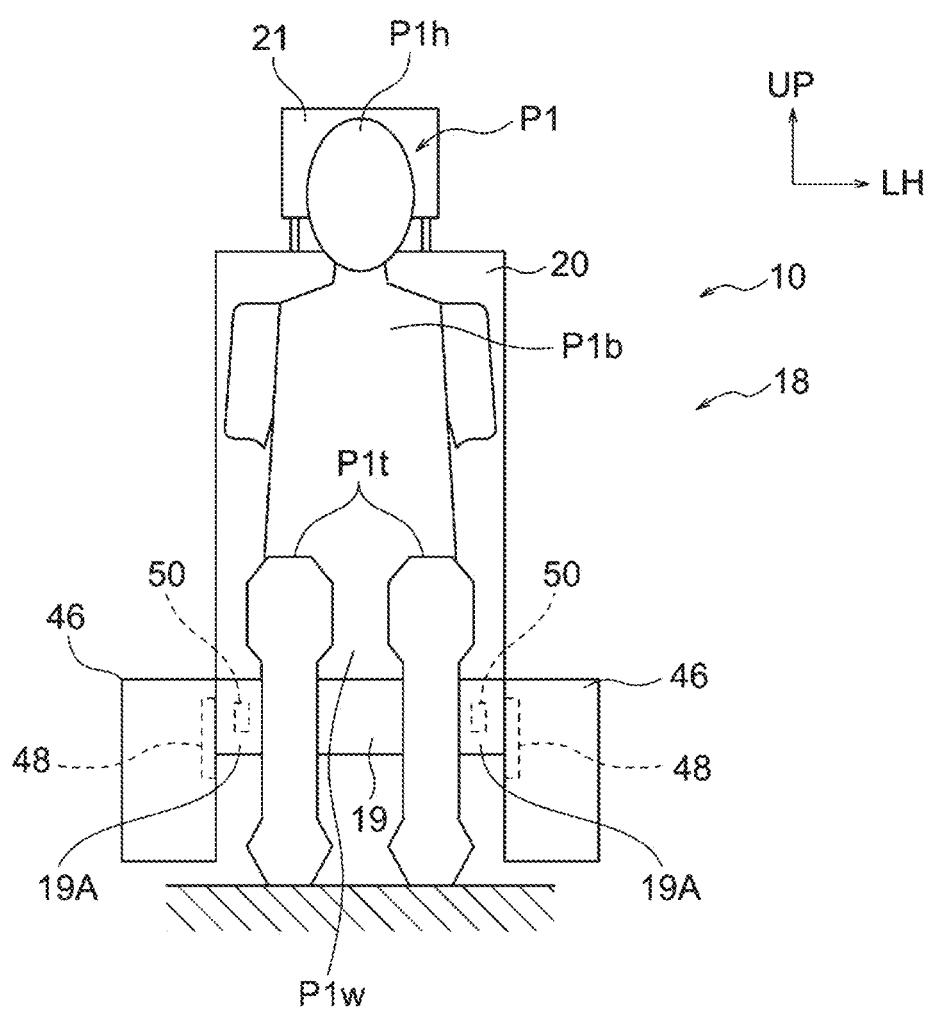
FIG. 11 is a schematic front view of a driver's seat and an occupant of a vehicle seat device according to a third embodiment.

Next, a third embodiment of the vehicle seat device 10 according to the present disclosure will be described with reference to FIGS. 11 and 12. The same components as those in the first embodiment are designated by the same reference symbols, and the description thereof will be omitted as appropriate.

The vehicle seat device 10 of the third embodiment has a pair of right and left consoles 46 instead of the armrests 24. Each of a pair of seat side portions 19A of the seat cushion 19 is provided with a slide mechanism 48 extending in the up-down direction, and the right and left slide mechanisms 48 support the resin consoles 46 so that the respective consoles 46 are slidable in the up-down direction. The right and left consoles 46 can slide independently of each other. Further, a pair of right and left electric motors 50 provided inside the seat cushion 19 is connected to the respective right and left slide mechanisms 48 via a reduction mechanism.

The right and left motors 50 are electrically connected to the ECU 36. When the occupant P1 operates the restraint portion movement switch described above, the movement control unit 362 of the ECU 36 supplies the electric power of the battery to the motors 50. At this time, when the movement control unit 362 transmits a forward rotation signal to the motors 50, the slide mechanisms 48 are operated and the consoles 46 move to the facing position shown in FIG. 12. In contrast, when the movement control unit 362 transmits a reverse signal to the motors 50, the slide mechanisms 48 are operated and the consoles 46 move to the retracted position shown in FIG. 11. The occupant P1 can move the right and left consoles 46 independently by operating the restraint portion movement switch. The consoles 46 located at the retracted position do not face the occupant P1 in the vehicle width direction. The consoles 46 located at the facing position face the hip point HP in the vehicle width direction.

Operations and Effects

Next, operations and effects of the third embodiment will be described.

Assume that the right and left consoles 46 are located at the retracted position. When a side collision occurs on the right side portion of the vehicle 12 traveling in this state, the detection unit 361 of the ECU 36 compares the magnitude of the acceleration detected by the side collision sensor 38 with the first threshold value and the second threshold value.

When the detection unit 361 determines that the detected acceleration is equal to or higher than the second threshold value, the movement control unit 362 transmits a forward rotation signal to the right and left motors 50. As a result, as shown in FIG. 12, the right and left consoles 46 are moved to the facing position by the right and left slide mechanisms 48, and each console 46 faces the hip point HP in the vehicle width direction. When the consoles 46 are located at the facing position before the side collision occurs, the ECU 36 does not transmit a signal to the right and left motors 50, and keeps the consoles 46 at the facing position.

Figure 12:
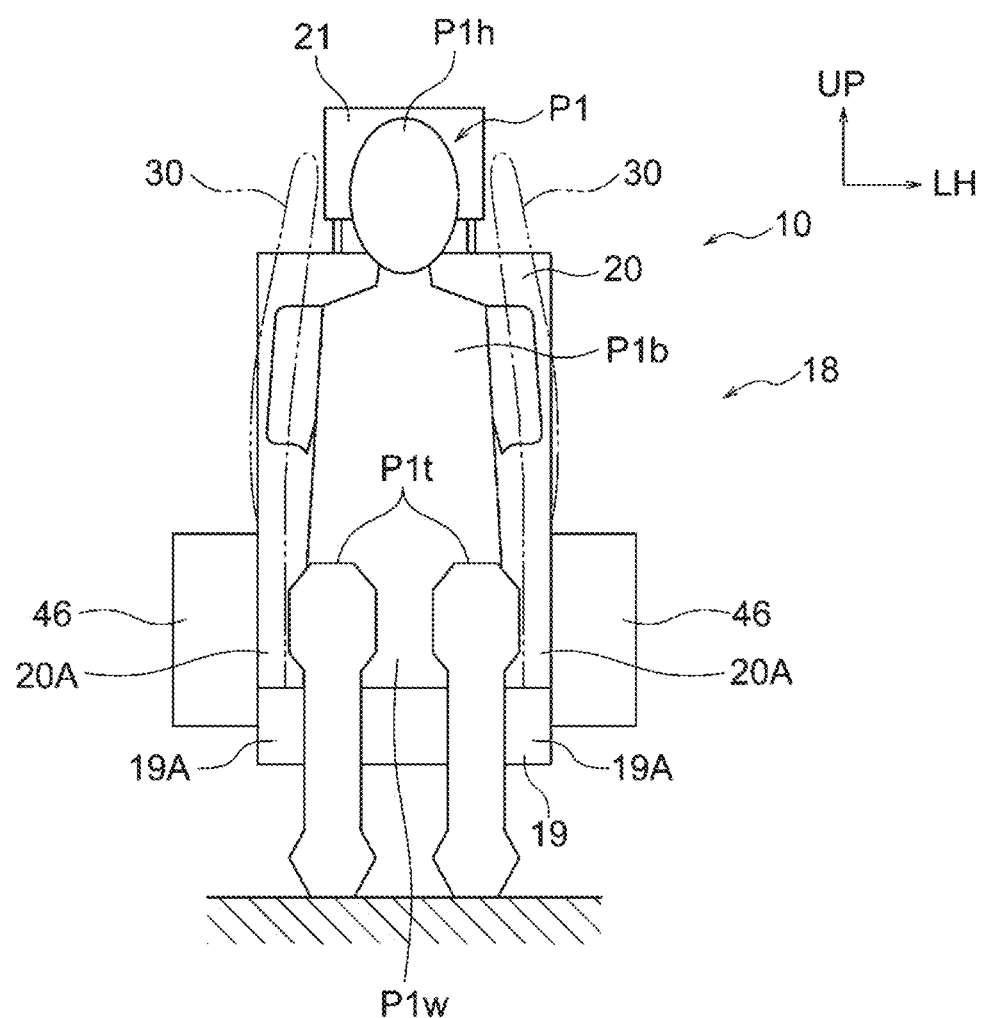
FIG. 12 is a front view similar to that of FIG. 4 of the driver's seat and the occupant shown in FIG. 11 when a side collision occurs in the vehicle.

Further, when the detected acceleration is equal to or higher than the first threshold value, the right and left side airbags 30 are expanded and deployed as shown in FIG. 12 and are located between the consoles 46 located at the facing position and the occupant P1.

As described above, in the vehicle seat device 10 of the third embodiment, when the detected acceleration is equal to or higher than the second threshold value, the ECU 36 positions the right and left consoles 46 at the facing position. Therefore, the vehicle seat device 10 of the third embodiment can exhibit the same operations and effects as the vehicle seat device 10 of the first embodiment.

Further, the vehicle seat device 10 uses the consoles 46, which are members generally provided in a vehicle, as the restraint portion. Therefore, the structure of the vehicle seat device 10 is simpler than that in the case where a member different from the consoles 46 is provided on the front seat 18 as the restraint portion.

Fourth Embodiment

Next, a fourth embodiment of the vehicle seat device 10 according to the present disclosure will be described with reference to FIGS. 13 to 15. The same components as those in the second embodiment are designated by the same reference symbols, and the description thereof will be omitted as appropriate.

The vehicle seat device 10 of the fourth embodiment has a slide rail mechanism (moving mechanism) 52 provided on the floor surface of the vehicle cabin 14A. The slide rail mechanism 52 includes a pair of lower rails 54 extending in the vehicle width direction and fixed to the floor surface, a pair of upper rails 56 slidably supported by the lower rails 54, a slide lock member (not shown) that allows or regulates the sliding operation of the upper rails 56, and a spring (not shown). The turntable 22 is supported by the pair of upper rails 56.

The slide lock member is urged to the lock position by the spring. Thus, when no external force is applied to the slide lock member, the slide lock member is located at the lock position, and the slide operation of the upper rails 56 is restricted. When the occupant P1 moves the slide lock member to the unlock position, the upper rails 56 become slidable with respect to the lower rails 54.

The steering wheel 15 of the present embodiment is provided on a right side portion of the dashboard 14B. Therefore, as shown by virtual lines in FIG. 13, the front seat 18 may be positioned on the right side portion of the vehicle cabin 14A. Further, since the vehicle 12 can be autonomously driven, the front seat 18 of the vehicle seat device 10 may be positioned at the center portion in the vehicle width direction as shown by solid lines in FIG. 13 or on the left side position of the vehicle cabin 14A.

Two optical sensors 62 are provided on the floor surface of the vehicle cabin 14A. Each optical sensor 62 has a light projecting unit 62A and a light receiving unit 62B located on the front side of the light projecting unit 62A. Each optical sensor 62 is connected to the ECU 36. Each light projecting unit 62A emits light toward the light receiving unit 62B. Each light receiving unit 62B receives the light emitted by the light projecting unit 62A. However, when an obstacle is located between the paired light projecting unit 62A and light receiving unit 62B, the light receiving unit 62B does not receive the light.

Figure 15:
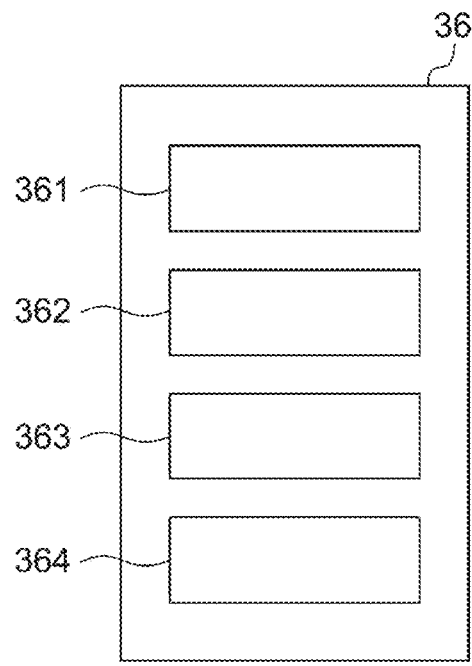
FIG. 15 is a functional block diagram of an ECU of the fourth embodiment.

As shown in FIG. 15, the ECU 36 of the present embodiment functions as the detection unit 361, the movement control unit 362, the inflator control unit 363, and a position determination unit 364.

A door airbag 58 is stored in a folded state in the internal space of each front side door (specific side portion) 16. Further, an inflator 60 connected to the ECU 36 is provided inside each door airbag 58. A part of the door airbag 58 and the inflator 60 are fixed to a fixing member (not shown) provided inside the front side door 16. The door trim 16A is provided with a tear line (not shown).

Operations and Effects

Next, operations and effects of the fourth embodiment will be described.

Figure 13:
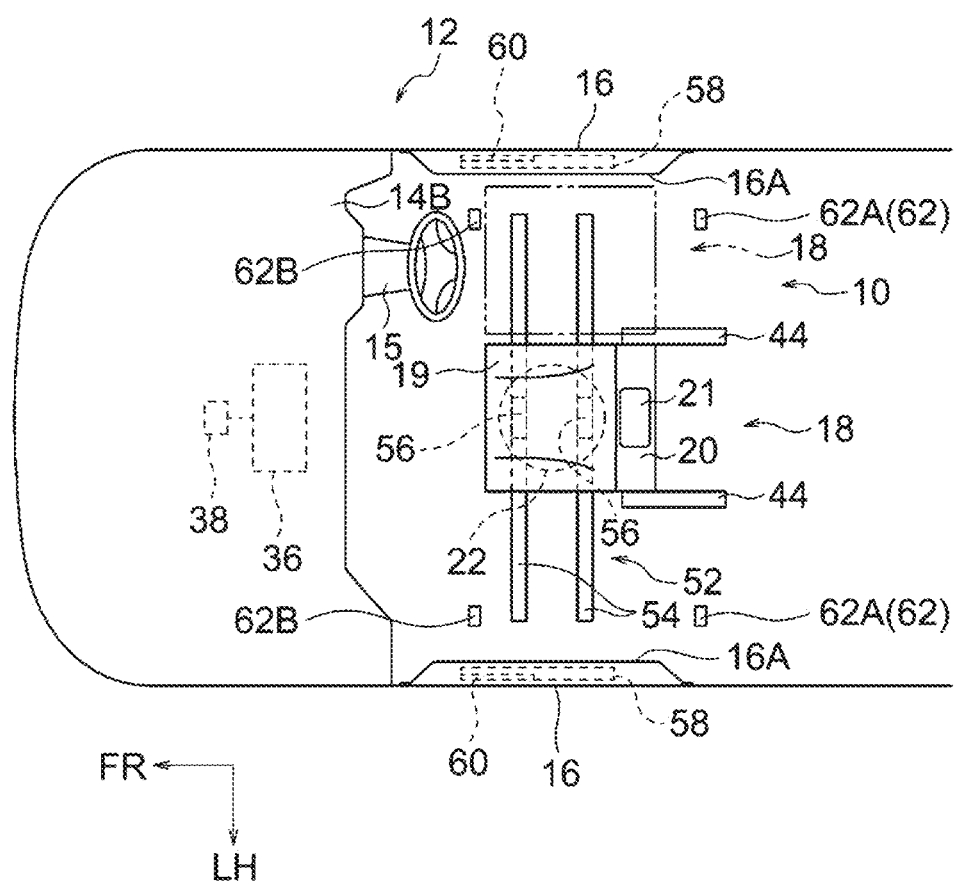
FIG. 13 is a plan view similar to that of FIG. 1 of a vehicle provided with a vehicle seat device according to a fourth embodiment.
Figure 14:
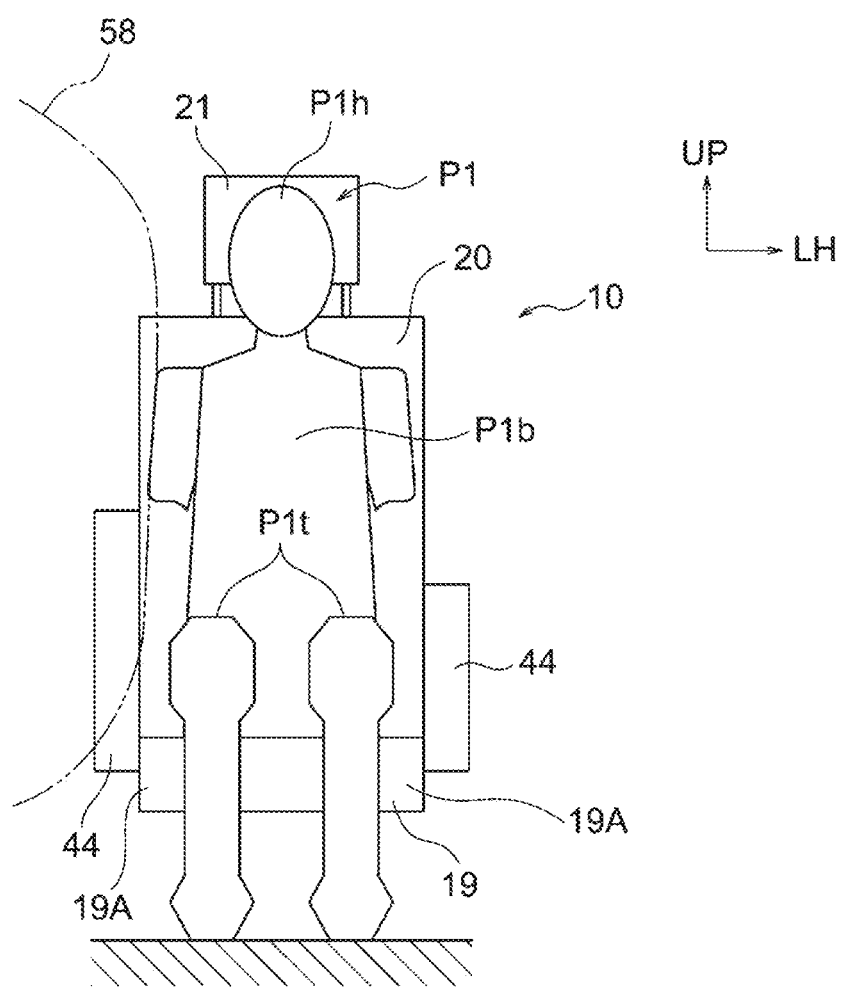
FIG. 14 is a schematic front view of a door airbag, a driver's seat, and an occupant provided in the vehicle shown in FIG. 13.

As shown in FIG. 13, when the front seat 18 is located at the center portion, the light emitted by each light projecting unit 62A is received by each light receiving unit 62B. However, for example, when the front seat 18 moves from the center portion toward the right side by a predetermined distance or more, a part of the front seat 18 is located between the light projecting unit 62A and the light receiving unit 62B on the right side. Thus, the light receiving unit 62B on the right side cannot receive the light emitted by the light projecting unit 62A on the right side. Therefore, the position determination unit 364 of the ECU 36 recognizes that the front seat 18 has moved by a predetermined distance or more from the center portion.

For example, when the front seat 18 moves from the center portion toward the right side by a predetermined distance or more, the front seat 18 is located on the right side portion of the vehicle cabin 14A. Assume that the occupant P1 operates the restraint portion movement switch in this state in order to rotate the right and left armrests 44 from the retracted position to the facing position. In this case, the movement control unit 362 of the ECU 36 transmits a forward rotation signal to the motor 28 on the left side, and does not transmit a forward rotation signal to the motor 28 on the right side. That is, when the front seat 18 moves from the center portion to one side in the vehicle width direction by a predetermined distance or more, the movement control unit 362 of the ECU 36 prohibits the armrest 44 on the one side of the front seat 18 from being located at the facing position. Therefore, as shown in FIG. 14, the armrest 44 on the left side rotates to the facing position, and the armrest 44 on the right side stays in the retracted position.

Further, assume that the acceleration detected by the side collision sensor 38 becomes equal to or higher than the first threshold value due to the occurrence of a side collision on the right side portion of the vehicle 12. At this time, the inflator control unit 363 of the ECU 36 transmits an operation signal to the inflator 32 on the left side and the inflator 60 of the front side door 16 on the right side. Thereby, as shown in FIG. 14, the door airbag 58 on the right side is expanded and deployed toward the vehicle cabin 14A while burst-opening the tear line of the door trim 16A. Further, the side airbag 30 on the left side is expanded and deployed (not shown in FIG. 14).

At this time, the armrest 44 on the right side is located at the retracted position. Therefore, the expansion and deployment of the door airbag 58 provided on the front side door 16 on the right side are not hindered by the armrest 44 on the right side and the side airbag 30 on the right side of the front seat 18.

Fifth Embodiment

Next, a fifth embodiment of the vehicle seat device 10 according to the present disclosure will be described with reference to FIGS. 16 to 18. The same components as those in the fourth embodiment are designated by the same reference symbols, and the description thereof will be omitted as appropriate.

The slide rail mechanism 52 of the vehicle seat device 10 of the fifth embodiment is provided with a drive mechanism (not shown). This drive mechanism includes feed screws that are parallel to the lower rails 54 and that are supported by the lower rails 54 so as to be rotatable around its own axis, nuts fixed to the upper rails 56 and screwed into the feed screws, and electric pulse motors that rotate the feed screws. The pulse motors are connected to the ECU 36. The front seat 18 is provided with a slide operation switch (not shown) connected to the ECU 36. As shown in FIG. 18, the ECU 36 of the present embodiment functions as the detection unit 361, the movement control unit 362, the inflator control unit 363, and a slide control unit 365. The slide rail mechanism 52 does not include a slide lock member and a spring.

When the occupant P1 operates the slide operation switch, the slide control unit 365 of the ECU 36 transmits a forward rotation signal or a reverse rotation signal to the pulse motors, and when the operation of the slide operation switch is stopped, the slide control unit 365 stops transmitting the signal. When the pulse motors rotate forward, the front seat 18 slides toward the right side, and when the pulse motor reverses, the front seat 18 slides toward the left side. The slide control unit 365 recognizes the position of the front seat 18 in the vehicle width direction by a well-known method using the number of pulse signals transmitted to the pulse motors and the rotation direction of the pulse motors.

The vehicle 12 of the present embodiment is not provided with the optical sensors 62. The steering wheel 15 is provided in the center portion of the dashboard 14B.

Operations and Effects

Next, operations and effects of the fifth embodiment will be described.

Figure 16:
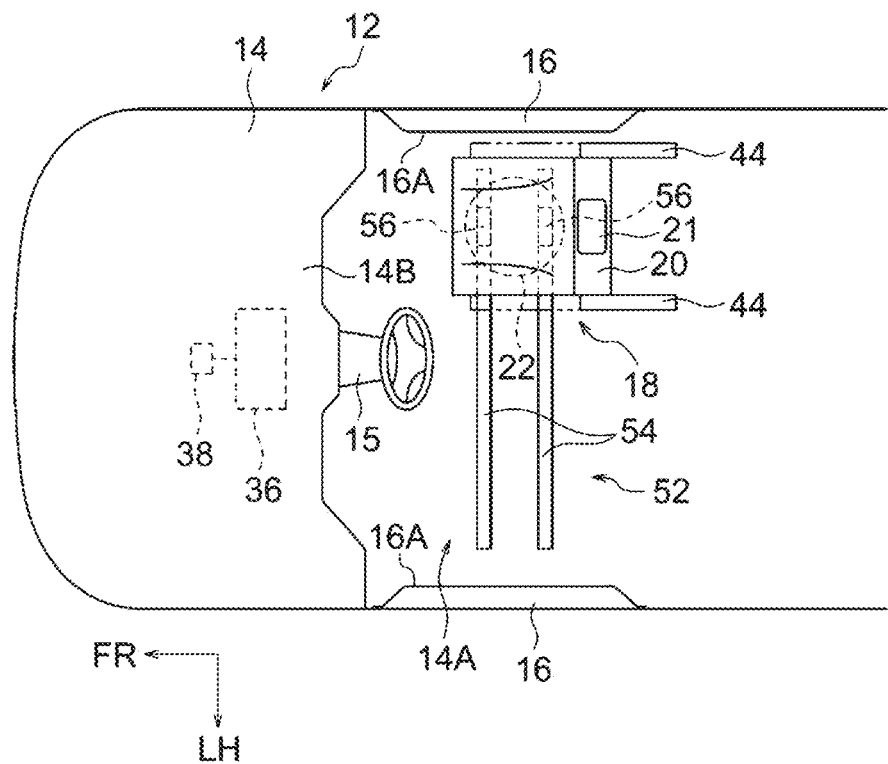
FIG. 16 is a plan view similar to that of FIG. 1 of a vehicle provided with a vehicle seat device according to a fifth embodiment.

When the front seat 18 is located further on the side from the center portion as shown in FIG. 16, the occupant P1 can change the position of the armrests 44. That is, when the restraint portion movement switch is operated, the movement control unit 362 of the ECU 36 transmits a signal to at least one of the right and left motors 28.

Further, when the right and left armrests 44 provided on the front seat 18 located at the position shown in FIG. 16 are located at the facing position, the ECU 36 allows the front seat 18 to move to the center portion. That is, in this case, when the slide operation switch is operated, the slide control unit 365 transmits a reverse signal to the pulse motors.

In contrast, when the right and left armrests 44 provided on the front seat 18 located at the position shown in FIG. 16 are located at positions other than the facing position, the ECU 36 prohibits the front seat 18 from moving to the center portion. That is, in this case, even when the slide operation switch is operated, the slide control unit 365 does not transmit a reverse signal to the pulse motors.

Figure 17:
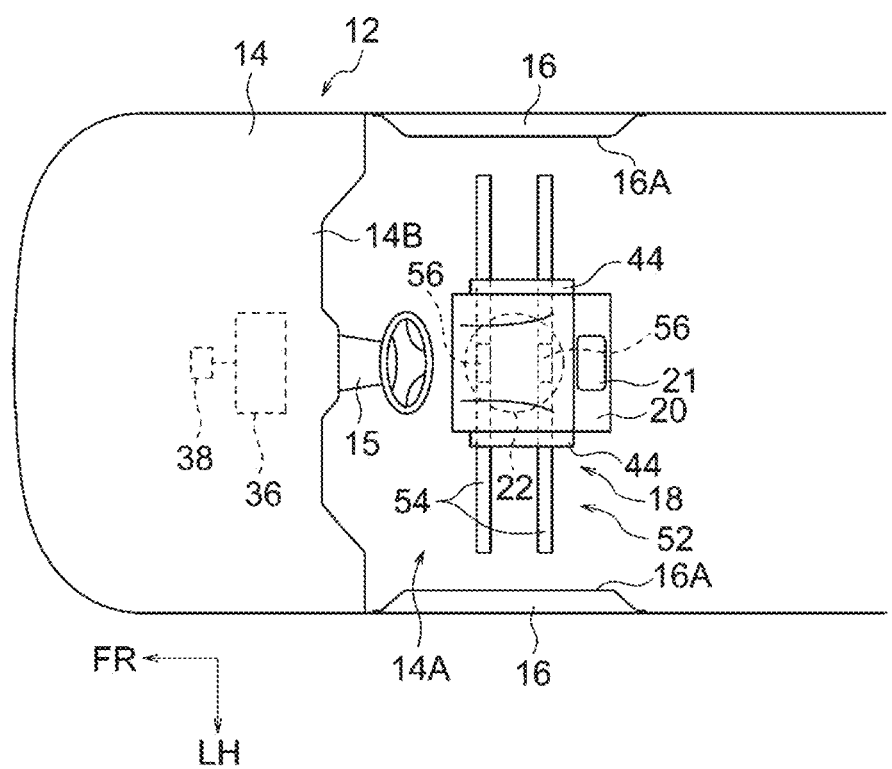
FIG. 17 is a plan view similar to that of FIG. 1 when a seat of the vehicle shown in FIG. 16 is moved to the center portion in the vehicle width direction.
Figure 18:
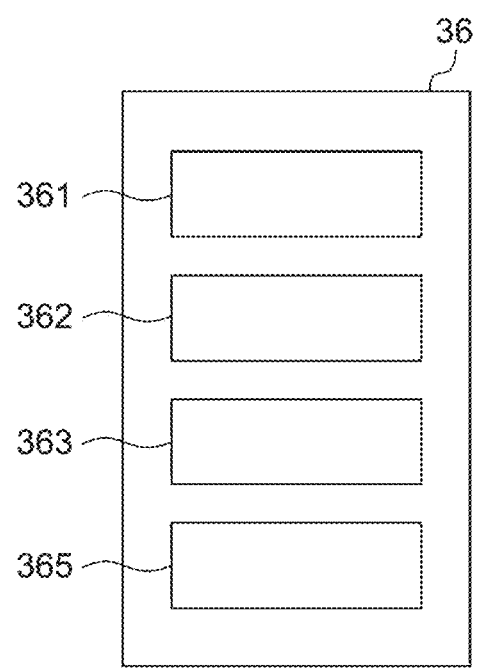
FIG. 18 is a functional block diagram of an ECU of the fifth embodiment.

When the front seat 18 slides to the center portion as shown in FIG. 17, the ECU 36 prohibits the armrests 44 from moving from the facing position toward the retracted position. That is, in this case, the movement control unit 362 does not transmit a reverse signal to the right and left motors 28 even when the restraint portion movement switch is operated.

As described above, in the vehicle seat device 10 of the fifth embodiment, when the front seat 18 movable in the vehicle width direction is located at the center portion, the right and left armrests 44 are always located at the facing position. Therefore, when a side collision occurs while the front seat 18 is located at the center portion and a failure has occurred in the motor 50, the occupant P1 can be restrained by the armrests 44 (and the side airbags 30).

Although each embodiment of the present disclosure has been described above, the present disclosure is not limited to these embodiments.

For example, when a side collision occurs, only one of the side airbag 30 (near side airbag) on the side where the side collision of the vehicle 12 has occurred (collided side) and the side airbag 30 (far side airbag) on the side opposite to the side where the collision has occurred (uncollided side) may be expanded and deployed. For example, when only the side airbag 30 on the collided side of the seat back is expanded and deployed, the side airbag 30 can restrain the occupant while receiving a reaction force from the restraint portion (armrests 24, 44, consoles 46) on the collided side located at the facing position.

The front seat 18 may include only one armrest 24, 44 or one console 46. For example, when the restraint portion (armrests 24, 44, consoles 46) is provided only on the seat side portion on the collided side, the restraint portion on the collided side can restrain the occupant when a side collision occurs.

The armrests 24, 44 and the consoles 46 may be provided on the front seat 18.

The armrests 24, 44 and the consoles 46 may be movable by the driving force of the motors and may be movable between the retracted position and the facing position by manual operation by the occupant P1. In the present modification, for example, the armrests 24, 44 or the consoles 46 can be moved when a failure occurs in the ECU 36.

The motors for moving the restraint portion (armrests 24, 44, consoles 46) may be omitted, and instead, the seat 18 may be provided with urging means (for example, a spring) (movement control unit) for moving and urging the restraint portion toward the facing position. In the present modification, when the occupant does not apply an external force to the restraint portion, the restraint portion is located at the facing position. Further, the occupant can move the restraint portion to the retracted position by applying an external force to the restraint portion.

The front seat 18 may be provided with the armrests 24, 44 and the consoles 46 as the restraint portion.

The restraint portion provided on the front seat 18 may be a member different from the armrests 24 and 44 and the consoles 46.

The front seat 18 may be provided with only one side airbag 30. For example, the seat back 20 may be provided with only the side airbag 30 on the uncollided side. In this case, the restraint portion is provided on the collided side and the uncollided side of the seat side portions of the front seat 18. When a side collision occurs in the modification in this mode, the restraint portion provided on the collided side of the seat side portion can restrain the occupant. Further, the side airbag 30 on the uncollided side, which is expanded and deployed and has received a reaction force from the restraint portion provided on the seat side portion on the uncollided side, restrains the occupant who has received the reaction force from the restraint portion on the collided side and has moved toward the uncollided side.

In the fourth embodiment, only one front side door 16 may include the door airbag (vehicle body airbag) 58.

In the fifth embodiment, when the front seat 18 slides to the center portion, the ECU 36 may allow the armrests 44 to move from the facing position toward the retracted position.

The vehicle body airbag provided on the vehicle body 14 may be a curtain airbag provided on at least one of the left side portion (specific side portion) and the right side portion (specific side portion) of the upper portion of the vehicle body 14.

The first threshold value and the second threshold value may have the same magnitude.

The front seat 18 may be provided on the vehicle 12 so that the seat cushion 19 is fixed in a normal state or an inverted state.

What is claimed is:

1. A vehicle seat device comprising:
   a detection unit configured to detect a side collision that has occurred to a vehicle;
   a seat that is provided in a vehicle cabin of the vehicle, wherein the seat is configured to be located at a center portion of the vehicle cabin in a vehicle width direction and to face at least one of a front side and a rear side in a vehicle front-rear direction;
   a restraint portion that is provided on a seat side portion that is a side portion of the seat, the restraint portion being movable between a retracted position in which the restraint portion is adapted to not face an occupant seated on the seat in the vehicle width direction, and a facing position in which the restraint portion is adapted to face the occupant in the vehicle width direction; and
   a movement control unit configured to position the restraint portion at the facing position when the seat is located at the center portion and the detection unit detects the side collision.

2. The vehicle seat device according to claim 1, wherein the detection unit is configured to, when the side collision occurs to the vehicle, determine whether an acceleration generated in the vehicle is equal to or higher than a predetermined first threshold value; and
   a side portion of a seat back of the seat is provided with a side airbag configured to, in response to the detection unit determining that the acceleration is equal to or higher than the predetermined first threshold value, expand and deploy, the side airbag being adapted to be located between the restraint portion located at the facing position and the occupant.

3. The vehicle seat device according to claim 2, wherein in response to the detection unit determining that the acceleration is equal to or higher than the predetermined first threshold value,
   the movement control unit is configured to position the restraint portion provided on the seat side portion on a collided side and on an uncollided side at the facing position, and
   the side airbag provided on the side portion of the seat back on the uncollided side is configured to expand and deploy.

4. The vehicle seat device according to claim 2, wherein the detection unit is configured to determine whether the acceleration generated in the vehicle is equal to or higher than a second threshold value smaller than the predetermined first threshold value; and
   the movement control unit is configured to, in response to the detection unit determining that the acceleration is equal to or higher than the second threshold value, position the restraint portion at the facing position.

5. The vehicle seat device according to claim 1, wherein the restraint portion located at the facing position is adapted to face a hip point of the occupant in the vehicle width direction.

6. The vehicle seat device according to claim 1, further comprising:
   a moving mechanism configured to support the seat to be movable in the vehicle width direction; wherein
   a vehicle body of the vehicle is provided with a vehicle body airbag configured to expand and deploy in the vehicle cabin so as to face a specific side portion that is at least one of a left side portion and a right side portion of the vehicle;
   the detection unit is configured to, when the side collision occurs to the specific side portion, determine whether an acceleration generated in the vehicle is equal to or higher than a predetermined first threshold value; and
   the movement control unit is configured to, when the seat moves from the center portion toward the specific side portion by a predetermined distance or more, prohibit the restraint portion provided on the seat side portion on a side of the specific side portion from being located at the facing position.

7. The vehicle seat device according to claim 1, further comprising:
   a moving mechanism configured to support the seat to be movable in the vehicle width direction; wherein
   when the seat is located further on a side portion side of the vehicle from the center portion and the restraint portion is located at the facing position, the moving mechanism is allowed to move the seat to the center portion; and
   when the seat is located further on the side portion side of the vehicle from the center portion and the restraint portion is not located at the facing position, the moving mechanism is prohibited from moving the seat to the center portion.

8. The vehicle seat device according to claim 1, wherein the restraint portion is at least one of an armrest and a console.

9. The vehicle seat device according to claim 1, wherein the restraint portion is movable between the retracted position and the facing position by manual operation.

* * * * *